UNITED STATES PATENT OFFICE.

EDGAR C. MERRILL, OF CHARLESTON, VERMONT.

IMPROVEMENT IN THE MANUFACTURE OF EMERY-WHEELS AND ARTIFICIAL STONE.

Specification forming part of Letters Patent No. 113,439, dated April 4, 1871.

I, EDGAR C. MERRILL, of Charleston, in the county of Orleans and State of Vermont, have invented a new and Improved Composition for Emery-Wheels and Artificial Stone.

The object of my invention is to provide a composition of minerals and cementing material which, when properly mixed, compressed, and molded, will make durable and useful emery-wheels and artificial stone.

To enable others to make use of my invention, I will give one formula for the manufacture of such wheels and stone.

In my patent dated October 12, 1869, and numbered 95,824, I have there stated and described my mode of procedure in making emery-wheels; and my present mode of manufacture consists in adding pulverized carbonate of baryta or Witherite to the mixture of emery, sand, and oxide of zinc before adding the chloride of zinc, when making emery-wheels; or I mix carbonate of baryta with sand or other pulverized mineral matter and oxide of zinc, before adding the chloride of zinc, when making artificial stone.

I find that by intimately mixing about three parts, by weight, of emery, sand, or other mineral matter with one part of oxide of zinc and one part of carbonate of baryta, to which I then add one part of chloride of zinc solution having a density of 66° on Baumé's hydrometer, I obtain a compound which, when compressed and molded, makes very good stones and wheels.

I have found, by experience, that it is best to calcine the oxide of zinc before mixing it with the other materials, and that dense solutions of chloride of zinc are the best for use in this compound.

I do not confine myself to these proportions of ingredients, nor to this exact mode of procedure; but previous to my experiments and practical manufacturing operations carbonate of baryta had not been used as an ingredient in artificial stone or emery-wheels; and it will be apparent to chemists and others that this mineral is especially adapted to this purpose, as its salts are not deliquescent. It prevents the absorption of moisture from the atmosphere by the compound containing chloride of zinc after it has been compressed and molded, and it also prevents the too rapid solidification or setting of the compound while it is being formed or molded. By so doing it adds to the strength and hardness of the stone.

It is essential to success in this manufacture that the compound should solidify hard and dry, and remain so; otherwise wheels and stones made from it are useless.

Having thus described my invention, I claim as new and desire to secure by Letters Patent—

1. A composition consisting of carbonate of baryta with oxide and chloride of zinc, made as herein described, or any other substantially the same, when used in emery-wheels or artificial stone.

2. Carbonate of baryta as an ingredient or component part of emery-wheels or artificial stone, as herein set forth.

EDGAR C. MERRILL.

Witnesses:
    EDWIN O. BENNETT,
    LEVI H. ALLEN.